United States Patent [19]

Shikano et al.

[11] Patent Number: 4,717,960
[45] Date of Patent: Jan. 5, 1988

[54] AUTOMATIC DIAPHRAGM CONTROL DEVICE OF VARIABLE PHOTOMETRY TYPE USED IN OBJECTIVE FOR TELEVISION CAMERA

[75] Inventors: Tohru Shikano; Terumi Ogasawara, both of Tokyo, Japan

[73] Assignee: Asahi Seimitsu Kabushiki Kaisha, Tokyo, Japan

[21] Appl. No.: 906,546

[22] Filed: Sep. 12, 1986

[30] Foreign Application Priority Data

Sep. 12, 1985 [JP] Japan .................................. 60-202172

[51] Int. Cl.⁴ .............................................. H04N 5/238
[52] U.S. Cl. ...................................................... 358/228
[58] Field of Search ......................................... 358/228

[56] References Cited

U.S. PATENT DOCUMENTS

| | | | |
|---|---|---|---|
| 4,451,851 | 5/1984 | Arai | 358/228 |
| 4,472,743 | 9/1984 | Ogasawara | 358/228 |
| 4,562,476 | 12/1985 | Shikano | 358/228 |
| 4,638,350 | 1/1987 | Kato | 358/228 |

*Primary Examiner*—Michael A. Masinick
*Attorney, Agent, or Firm*—Birch, Stewart, Kolasch & Birch

[57] ABSTRACT

An automatic diaphragm control device for the objective of a television camera, utilizing a video signal coming from the television camera to effect the diaphragm control The present invention provides a device including a fixed photometric circuit of a drastic peak characteristic in a part of a variable photometric circuit so as to be readily switched to perform a drastic peak photometric adjustment, in addition to an ordinary variable photometric adjustment, and also provides an automatic diaphragm control device of variable photometry type used in a television camera in which the variable photometric circuit is also arranged so as to be switched between the variable peak mode and the variable average mode so that a simple operation of changing over on one and the same circuit permits the variable photometry of both types to be selectively performed in order to obtain not only the drastic peak photometric characteristic but also versatile photometric characteristics optimized for various requirements.

5 Claims, 12 Drawing Figures

FIG. 7
(a)
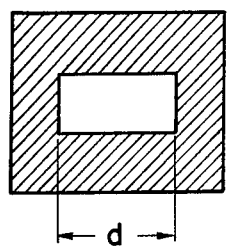
(b) $V_{IN}$
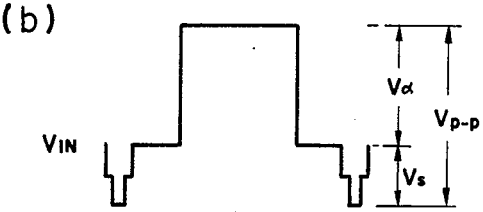
(c) $V_{33}$
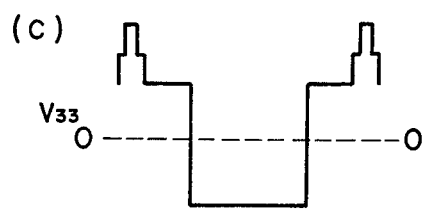
(d) $V_P$ (R=0)
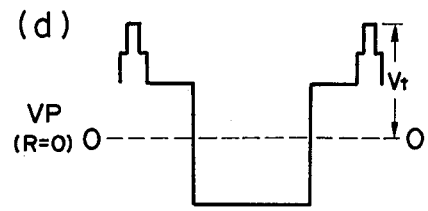
(e) $V_{P2}$ (R=∞)
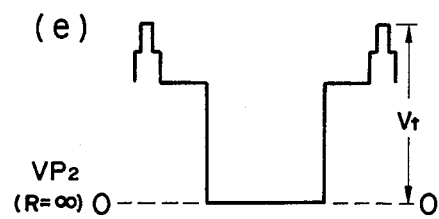

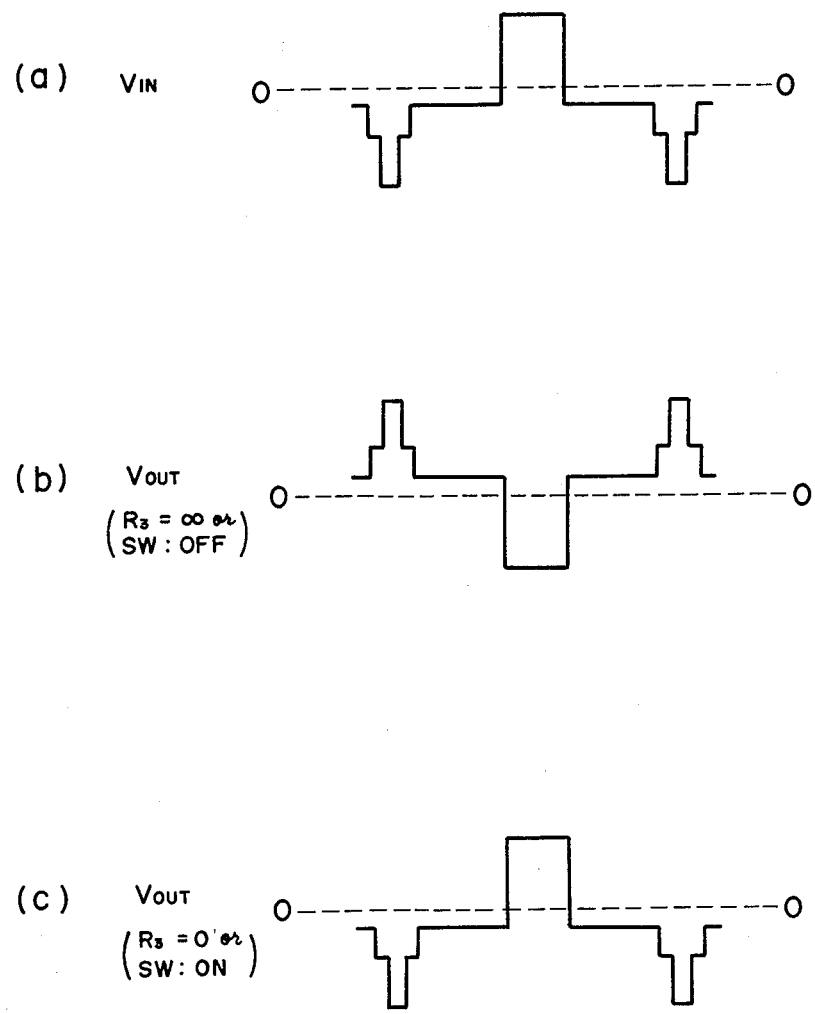

FIG.11
(a)
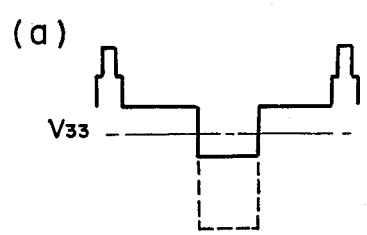
(b)
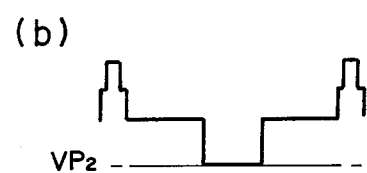
FIG.12
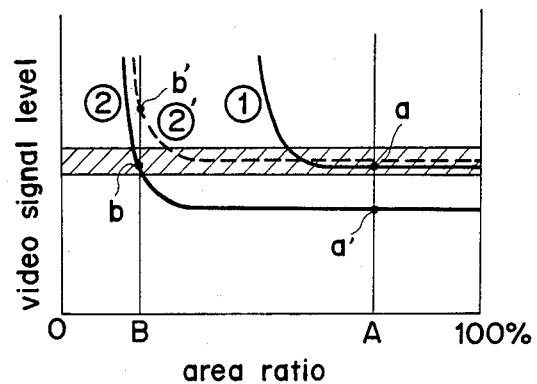

AUTOMATIC DIAPHRAGM CONTROL DEVICE OF VARIABLE PHOTOMETRY TYPE USED IN OBJECTIVE FOR TELEVISION CAMERA

BACKGROUND OF THE INVENTION

Industrial field of application

The present invention relates to an automatic diaphragm control device of variable photometry type where its objective is for television cameras that are adapted for automatically controlling the objective diaphragm utilizing a video signal supplied from the television camera.

Prior art

As has already been disclosed, for example, in the specifications of U.S. Pat. No. 4,451,851 and U.S. Pat. No. 4,472,743, the conventional television camera utilizing the video signal for automatic diaphragm control is provided with the control circuit having the photometric mode converting function and the sensitivity adjusting function so as to adapt to various shooting environments.

To obtain the optimum picture, in addition to the proper sensitivity adjustment depending on the absolute luminance of an object to be shot, the luminance ratio of bright and dark areas, i.e., the range of contrast is one of the important factors. The range of contrast in the natural world is as high as an order of 10:1 even under clouded sky and often an order of 100:1 under bright sky while the range of contrast which can be represented on the television-reproduced picture is as low as 30 to 40:1. Accordingly, for the picture simultaneously including a bright area and a dark area, it is impossible for a viewer to see both of these areas simultaneously and it must be determined whether the bright area should be selected as the main object to be shot or the dark area should be selected as the main object to be shot.

Theoretically, so-called average photometry mode is suitable for the case in which the dark area is selected as the main object to be shot while so-called peak photometry mode is preferable for the case in which the bright area is selected as the main object to be shot. As the video photometric method of prior art utilizing the video signal coming from the television camera for diaphragm control, any one of the abovementioned types. However, use of such photometric method in a fixed manner has caused various inconveniences. Specifically, for the picture simultaneously including the bright area and the dark area, the average photometry mode has often resulted in the bright area being solidly white or gradientless while the peak photometry mode has often made the dark area, which should be adequately visible in view of the camera sensitivity, almost invisible. With both the peak photometry mode and the average photometry mode, it is required to determine whether the bright area should be selected as the main object to be shot or the dark area should be selected as the main object to be shot, for the scene simultaneously including these bright and dark areas. It is preferred, therefore, that when the object to be shot has no extremely dark area, namely it is in a low contrast condition, the video signal of a same level is obtained even after the photometry mode has been variable adjusted.

Referring to FIG. 12, for example, with a photometric adjuster circuit having its characteristic change from the curve (1) to the curve (2), which provides a steeper gradient of the video signal level, as the photometric mode is variably adjusted from the average photometry mode to the peak photometric mode for a low constrast object, it is assumed that an area ratio of the bright zone to the overall scene is A, a video signal level a covered by the optimum range (shaded zone) has obtained by selecting the characteristic (1). If the area ratio is changed by zooming from A to B, the video signal level would be substantially in excess of said optimum level range and result in an over-luminance. Certainly, the photometry mode may be variably adjusted to the characteristic (2) at this time point to obtain a video signal level b covered also by said optimum range again. However, when the area ratio A is restored by zooming, there occurs an under-luminance a'. To restore the optimum level range a, the photometric mode must be adjusted again to the characteristic (1) or the characteristic (2) must have a sensitivity adjustment to obtain the characteristic (2)'. According to the characteristic curve (2)', an over-luminance b' appears at the area ratio B. Thus, with the photometry adjuster circuit presenting the steeper gradient of the video signal level in the low contrast condition, the selective adjustment between the sensitivity adjustment and the photometric mode adjustment is so difficult that the adjustment may often be disturbed.

To avoid such disturbance, it is desirable that the characteristic video signal level exhibits no substantial variation in the low contrast condition whether the average photometry mode or the peak photometry mode is selected and, therefore, adjustment of the video signal level can be achieved only by the sensitivity adjustment in the low contrast condition while variable adjustment of the photometry mode is effective only in the high contrast condition.

SUMMARY OF INVENTION

Problems to be solved by invention

FIG. 2 illustrates characteristic curves exhibited by photometric adjuster means of variable peak photometry type which will be described in detail later, in which (1) represents a characteristic curve of the average photometry mode and (2) represents a characteristic curve of the peak photometry mode. The photometry adjuster means of this type maintains the video signal level constant until the area ratio of the bright zone to the scene overall decreases to a certain value S (1) or S (2), respectively, and cannot maintain the peak value as said area ratio is further reduced, since there occurs then an over-luminance. Accordingly, during variation in the area of the bright zone, particularly during variation of the focal distance by zooming, an abrupt change of the video signal level at the certain point S (1) or S (2) sometimes gives a viewer an unnatural impression. Nevertheless, such photometry adjuster means is suitable for a case in which the main object to be shot is limited to the bright zone of the scene and only this bright zone is continuously regarded.

FIG. 4 illustrates characteristic curves exhibited by photometry adjuster means of variable average photometry type which will be mentioned more in detail later, in which a curve (1) represents a characteristic obtained when the average photometry mode is selected and a curve (2) represents a characteristic obtained when the peak photometry mode is selected. The photometry adjuster means of this type is characterized in that the video signal level gradually varies as the area of the bright zone varies and such gradual variation occurs also when the area ratio of the bright zone is changed by zooming. With the consequence, unnatural impression encountered by the photometry adjuster means of the previously mentioned type can be eliminated by the photometry adjuster means of this type but the latter is not suitable for the case in which only the bright zone is concentratively regarded.

As will be obvious from the foregoing description, all of these photometric adjustments are adapted to adjust a variation of the video signal level according to the area ratio of the bright zone to the overall scene, when the latter is of a relatively high contrast, and the over-luminance occurs as said area ratio of the bright zone is further reduced not only when the variable average photometry mode is selected but also when the variable peak photometry mode is selected, although such over-luminance is remarkable particularly when the variable average mode is selected. To solve this problem of the over-luminance, it will be advantageous that the photometry adjuster means can selectively have a drastic peak characteristic as represented by a curve (3) in FIGS. 2 and 4.

However, incorporation of the two photometric circuits into the objective as diaphragm control circuits which may be changed over to each other as desired will be extremely difficult, because a space for these photometric circuits is restricted in view of a serious demand for a compact objective.

A first and principal object of the present invention is to provide a device including a fixed photometric circuit of a drastic peak characteristic in a part of a variable photometric circuit so as to be readily switched by switching means to perform a drastic peak photometric adjustment, in addition to an ordinary variable photometry adjustment.

A second object of the present invention is to provide an automatic diaphragm control device of variable photometry type used in a television camera in which the variable photometric circuit is also arranged so as to be switched between the variable peak mode and the variable average mode so that a simple operation of changing over on one and the same circuit permits the variable photometry of both types to be selectively performed in order to obtain not only said drastic peak characteristic but also versatile photometric characteristics optimum for various requirements.

Measures to solve problems

These objects are achieved, according to the present invention, by providing an automatic diaphragm control device of variable photometry type used in the objective of a television camera including the variable photometry adjuster means as illustrated by FIG. 2 or 4 and the photometric means having drastic peak characteristic and utilizing a video signal coming from the television camera to effect the diaphragm control, said automatic diaphragm control device comprising: first means consisting of sensitivity adjusting means principally to adjust a video output signal in a low contrast condition; second means consisting of variable photometry adjusting means principally to adjust a video output signal in a high contrast condition; third means for photometric adjustment of a video output signal in a drastic peak mode independently of the photometric adjustment by said second means; and means permitting said second and third means to be selectively used as desired by switching therebetween. As another solution, the present invention provides an automatic diaphragm control device of variable photometry type used in the objective of television camera having said variable peak photometric characteristic as illustrated in FIG. 2 and said variable average photometric characteristic as illustrated in FIG. 4 incorporated into one and the same circuit so as to be readily changed over therebetween for selective use thereof and utilizing a video signal coming from the television camera to effect the diaphragm control, said automatic diaphragm control device comprising: first means consisting of sensitivity adjusting means principally to adjust a video output signal in a low contrast condition; second means consisting of variable photometry adjusting means principally to adjust a video output signal in a high contrast condition; third means for photometric adjustment of a video output signal in a drastic peak mode independently of the photometric adjustment by said second means; means permitting said second means to be selectively used as means for the variable photometry in an extreme peak mode and means for the variable photometry in an extreme average mode as desired by switching therebetween; and means permitting said third means to be selectively used as desired by switching. As a further solution, the present invention provides an automatic diaphragm control device of variable photometry type used in the objective for television camera, said automatic diaphragm control device comprising: first means consisting of an inverted amplifier adapted for inverted amplification of a video signal output from the television camera with a variable amplification ratio relative to a reference voltage; second means adapted to be selectively used as desired, by switching, as means for peak photometric adjustment consisting of a voltage doubling rectifier including a capacitor of which the charging voltage can be adjusted by voltage doubling and rectifying the video signal inversionally amplified in said inverted amplifier and means for an average photometric adjustment consisting of a limiter circuit adapted to adjustably limit a negative component of the video signal inversionally amplified in said inverted amplifier; third means for photometric adjustment of the video output signal in an extreme peak mode independently of the variable photometric adjustment performed by said second means; and means permitting said second and third means to be selectively used as desired by switching therebetween.

Functions

A first function of the device constructed according to the present invention is based on a feature such that a fixed photometric circuit of a drastic peak characteristic is a part of a variable photometric circuit so to be readily switched as by switching means to perform a drastic peak photometric adjustment, in addition to an ordinary variable photometric adjustment. A second function of the device according to the present invention is based on a feature such that the variable photometric circuit is also arranged so as to be switched between the variable peak mode and the variable average mode so that a simple operation of changing over on one and the same circuit permits the variable photometry of both types to be selectively performed in order to obtain not only said drastic peak characteristic but also versatile photometric characteristics optimum for various requirements.

BRIEF DESCRIPTION OF DRAWING

FIG. 7 is a diagram illustrating an object to be shot and waveforms of the video signal in the respective circuit stages;

FIG. 9 is a diagram illustrating waveforms of the video signal depending on the characteristics;

FIG. 11 is a diagram illustrating waveforms of the video signal depending on characteristics; and FIG. 12 is a diagram illustrating the characteristics involving various problems in the prior art.

EMBODIMENTS

The present invention will be described more in detail with reference to preferred embodiments as illustrated by the accompanying drawing.

Figure 1:
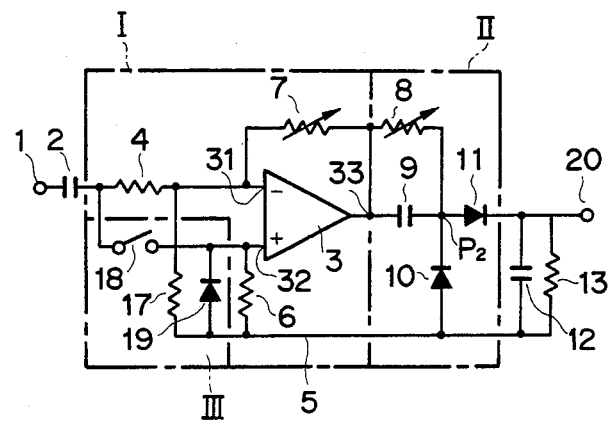
FIG. 1 is a circuit diagram illustrating an important part in an embodiment of the device constructed according to the present invention.

Referring to a circuit diagram illustrated by FIG. 1, reference numeral 1 designates a video signal input terminal adapted to input a video signal coming from the television camera to the device according to the present invention, and this terminal is connected through a capacitor 2 to first means I consisting of an inverted amplifier including components such as a resistor 4, a variable resistor 7 and an operational amplifier 3.

In the inverted amplifier, an inverted input terminal 31 of the operational amplifier 3 is connected through the resistor 4 to said capacitor 2 while a non-inverted input terminal 32 is connected through a resistor 6 to a reference voltage terminal 5 regulated to a mid-point voltage corresponding to a half of a source voltage. The variable resistor 7 is disposed as a feedback resistor between the inverted input terminal 31 and an output terminal 33. The inverted amplifier is adapted to inversionally amplify the video signal having its DC component removed in said capacitor 2 and to adjust a resistance value of said variable resistor 7 relative to said resistor 4 in order to change an amplification ratio of the operational amplifier 3.

Reference numeral II designates second means consisting of a voltage doubling rectifier adapted for voltage doubling amplification of the video signal which has been inversionally amplified by said inverted amplifier, in which a voltage doubling capacitor 9 including a variable resistor 8 connected in parallel therewith is connected to the output terminal 33 of said operational amplifier 3, the reference voltage terminal 5 is connected through a diode 10 to an output terminal P2 of said capacitor 9 and a diode 11 is serially connected to said output terminal P2. The variable resistor 8 functions to change a charging voltage of the voltage doubling capacitor 9 and is so arranged that said charging voltage becomes zero when said variable resistor 8 has a resistance value of zero and increases as the resistance value increases. The diode 11 serves to DC rectify a signal appearing at the output terminal P2 of the capacitor 9. To smooth this rectified signal, there is provided a capacitor 12 and a resistor 13 between an output terminal of said diode 11 and the reference voltage terminal 5.

Reference numeral III designates the third means according to the present invention which is adapted to adjust the charging voltage of the capacitor 2 so as to convert the photometric characteristic to that of a drastic peak mode. In the embodiment illustrated, the output terminal of the capacitor 2 is connected through a switch 18 and a diode 19 to the reference voltage terminal 5.

Figure 8:
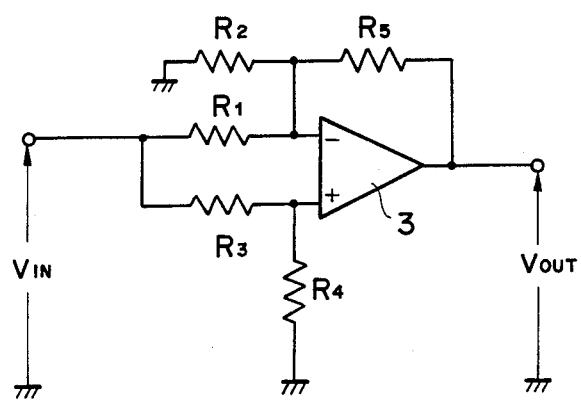
FIG. 8 is a circuit diagram illustrating a basic circuit in the third means.

A circuit characteristic of the third means III will be now considered in reference with a principle diagram of FIG. 8. A relationship between an input voltage Vin and an output voltage Vout is given by a following equation:

$$V_{out} = \left[ \frac{R4}{R3 + R4}\left(1 + \frac{R5}{R1} + \frac{R5}{R2}\right) - \frac{R5}{R1} \right] V_{in}$$

In the equation above, Vout may take various values as a function of R3 and when R3=infinity $$V_{out} = -(R5/R1)\cdot V_{in},$$

and when R3=0

$$V_{out} = (1+R5/R2)\cdot V_{in}.$$

Thus, the output voltage Vout has opposite polarities according to the values of R3, i.e., those of infinity and zero.

In the embodiment illustrated by FIG. 1, the resistor R3 comprises the switch 18, and a state of the switch OFF corresponds to R3=infinity while a state of switch ON corresponds to R3=0.

Assuming that a signal having a waveform Vin of FIG. 9(a) is applied as an input signal to the circuit of FIG. 8, an inverted output signal Vout as illustrated by FIG. 9(b) is provided when the variable resistor R3 is set to infinity (i.e., switch OFF) and a non-inverted output signal Vout as illustrated by FIG. 9(c) when the variable resistor R3 is set to zero. Both of these output signals contain no DC component and, therefore, are in a stabilized state in which positive and negative areas are equal to each other with respect to a base line 0−0.

In this way, the circuit functions as an average photometric circuit when R3=infinity (switch OFF). Specifically, the circuit is affected by a variation in the amplitude so long as a bright zone (central rectangular zone) is relatively large and such influence decreases as the bright zone becomes small. The circuit functions as a peak photometric circuit when R3=0 (switch ON) and can detect a variation of the amplitude even if the bright zone becomes small.

The diode 19 which is connected through the switch 18 to the reference voltage terminal 5 as illustrated by FIG. 1 is turned ON with the negative component of the input signal Vin when the switch 18 is in the state of ON and charges the capacitor 2, and turned OFF with the following positive signal component, a positive voltage results that is added to the previously charged negative voltage to achieve amplification. Thus, there is established a circuit having a drastic peak characteristic which can detect the signal corresponding to a small bright zone even for a low contrast object to be shot.

In the circuit arrangement as mentioned above, it is assumed that a video signal Vin of a waveform as illustrated by FIG. 7(b) is applied to the video signal input terminal 1 with respect to a test chart of FIG. 7(a) when the switch 18 in the third means III is in the state of OFF. In this waveform a rectangular portion at the positive side corresponds to a bright zone of the picture, Vd represents a video level and Vs represents a synchro level. This video signal Vin is inversionally amplified in the inverted amplifier as illustrated by FIG. 7(c) and is output as an inverted signal V33 on the output terminal 33 of said inverted amplifier. This inverted signal V33 has its DC component already removed by the capacitor 2 and, in consequence, it is in a stabilized state in which the positive area and the negative area are equal to each other with respect to the base line (mid-point voltage line 0−0). Now the variable resistor 7 may be adjusted so as to increase its resistance value relative to the resistor 4 to increase an amplification ratio of the inverted amplifier proportionally and vice versa. Thus, the amplification ratio may be changed to adjust the amplitude Vp-p of the inverted signal V33 and thereby to achieve the sensitivity adjustment which is the function of the first means I according to the present invention.

The inverted signal V33 is then rectified in the voltage doubling rectifier. At this point, adjustment of the variable resistor 8 to the resistance value of 0 results in that the capacitor 9 does not function at all and a signal VP2 appearing at the output terminal P2 of said capacitor 9 becomes equal to the inverted signal V33 as seen in FIG. 7(d). Although the diode 10 is turned on with the negative component of the inverted signal V33, passage through the resistor 8 (R=0) prevents the capacitor 9 from being charged and the positive voltage V+ depends on an average value. Therefore, such photometric mode can be considered as the average photometric mode as indicated by the characteristic curve (1) in FIG. 2, which is suitable for the case in which a dark zone is selected as the main object to be shot. When the variable resistor 8 is adjusted to the resistance value of infinity, on the other hand, the diode 10 is turned on with the negative component of the inverted signal V33 and the capacitor 9 is charged. A following positive signal is added to the previously charged voltage and the output signal VP2 is DC rectified as illustrated by FIG. 7(e), so that the amplitude of the video level Vd can be detected even when a width d of the bright zone is relatively small. Accordingly, such photometric mode with the variable resistor 8 being adjusted to the resistance value of infinity can be considered as the peak photometric mode as indicated by the characteristic curve (2) in FIG. 2, which is suitable for the case in which the bright zone is selected as the main object to be shot. It should be understood that the variable resistor 8 may be adjusted to the intermediate resistance value to obtain the corresponding intermediate photometric mode which may be indicated by a curve having its rising portion within the shaded zone in FIG. 2.

Figure 2:
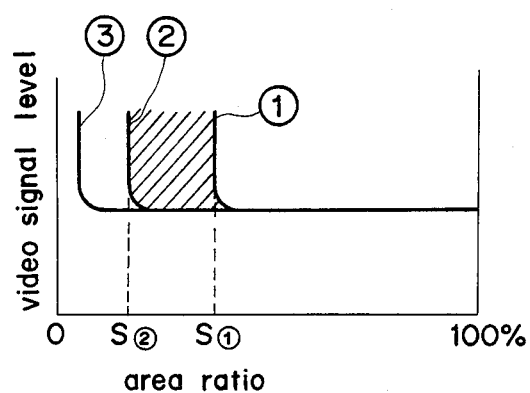
FIG. 2 is a diagram schematically showing a variation in characteristics of the device depending on a photometric adjustment.

In the low contrast condition, an amplitude Vd corresponding to the bright zone is low relative to the full amplitude Vp-p of FIG. 7(b) and there is no variation in the amplitude V+ of FIGS. 7(d) and (3). As a result, the video signal level is not substantially affected by conversion of the photometric mode. Referring to FIG. 2 illustrating characteristics of the respective photometric modes, the curve (1) indicates the characteristic of the peak photometric mode and the curve (2) indicate the characteristic of the peak photometric mode. As will be obvious from FIG. 2, in which the abscissa indicates the area ratio of the bright zone (with respect to the overall scene) and the ordinate indicates the video signal level, the video output signal level is substantially constant no matter whether the average photometric mode (1) is selected or the peak photometric mode (2) is selected so long as the area ratio is higher than S (1). This means that the video signal level is not affected by the photometric adjustment in the low constrast condition. Furthermore, even if said area ratio is varied by the operation of zooming, the video signal level is maintained substantially constant for the object to be shot, in which the area ratio of the bright zone is higher than S (1).

In this manner, the sensitivity adjusting means relying upon the variable resistor 7 of said inverted amplifier constitutes the first means principally serving to adjust the video output signal during the low contrast while the photometric adjusting means relying upon the variable resistor 8 of said voltage doubling rectifier constitutes the second means principally serving to adjust the video output signal during the high contrast, and the video output signal level once adjusted by the first means is free from any substantial variation even when said second means is adjustably activated during the low contrast.

When the switch 18 of the third means III according to the present invention is turned ON, a non-inverted amplified signal forming a drastic peak appears on the output terminal 33 of the operational amplifier 3, as has previously been mentioned, and thus a photometric characteristic as indicated by the curve (3) in FIG. 2 is obtained at the circuit output terminal 20, permitting a drastic peak photometry to be achieved with respect to a small spot in the bright zone.

Figure 3:
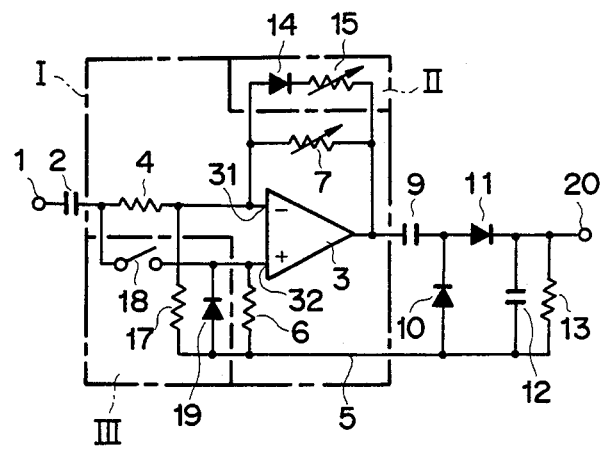
FIG. 3 is a circuit diagram similar to FIG. 1 but concerning another embodiment.

In the circuit arrangement as illustrated in FIG. 3, the basic construction of the voltage doubling rectifier and the third means III is identical to that of FIG. 1 and the circuit elements of similar functions are designated by the similar reference numerals. Specifically, the circuit arrangement corresponds to the circuit arrangement of FIG. 1 except that the variable resistor 8 for photometric adjustment is replaced by a limiter circuit for photometric adjustment as the second means II provided in the inverted amplifier. The limiter circuit functions to limit the negative output of the video signal inversionally amplified in the operational amplifier 3 and connected in parallel with the variable resistor 7 for sensitivity adjustment.

The limiter circuit comprises a diode 14 and a variable resistor 15 adapted to control the current flowing through said diode 14. The anode of said diode 14 is connected to the inverted input terminal 31 of the operational amplifier 3 and the cathode thereof is connected through the variable resistor 15 to the output terminal 33. The limiter circuit is so arranged that, as indicated by a solid line (2) in FIG. 10, an input/output characteristic may be obtained, in accordance with the negative side of the operational amplifier 3 which is forcibly suppressed by the diode 14. More specifically, referring to FIG. 10 in which the abscissa indicates an input voltage V31 on the input terminal 31 and the ordinate indicates an output voltage V33 on the output terminal 33, the negative output voltage V33 would be represented by a broken line (1) in FIG. 10 as the input voltage V31 increases in excess of α, so as in accordance with the normal input/output characteristic. However, said limiter circuit III is adapted to limit the output voltage V33 so as to be maintained at the level of β as indicated by a solid line (2), even when the input voltage increases beyond α. The variable resistor 15 of the limiter circuit may be properly adjusted to obtain the peak photometric mode, the average photometric mode or the intermediate photometric mode.

Figure 4:
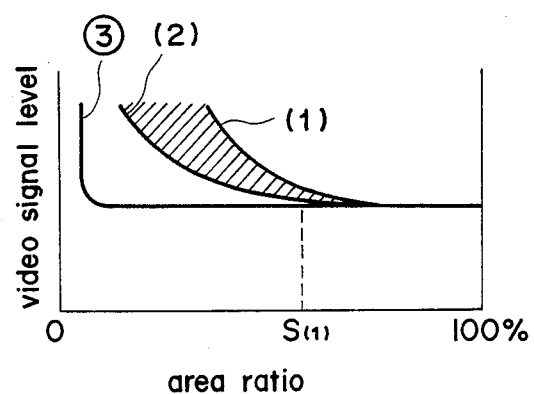
FIG. 4 is a diagram similar to FIG. 2 but concerning the embodiment of FIG. 3.
Figure 10:
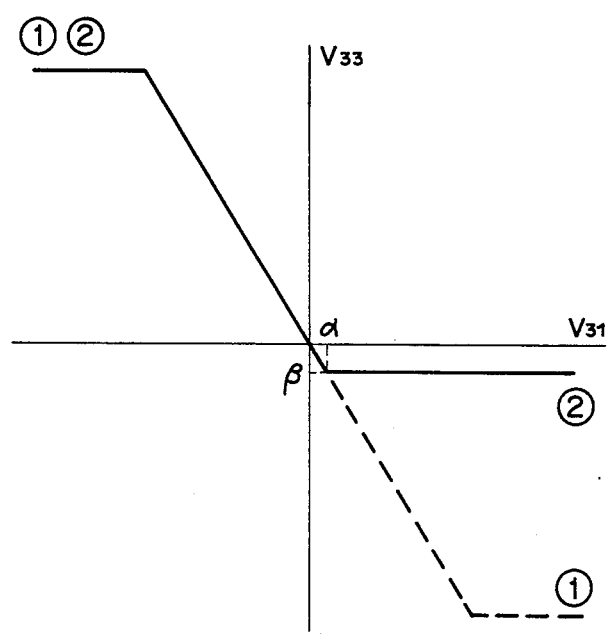
FIG. 10 is a diagram illustrating characteristics exhibited by another embodiment of the limiter circuit in the second means.

First, when the variable resistor 15 is adjusted to the resistance value of infinity, the limiter circuit is not activated and, as a consequence, the inverted signal V33 has a waveform as illustrated by FIG. 7(c). This inverted signal V33, when input to the voltage doubling capacitor 9 of the voltage doubling rectifier, is DC-regenerated by the diode 10 as V+ without any change of its amplitude Vp-p as seen in FIG. 7(e), thus providing the peak photometric mode in which the bright zone is selected as the main object to be shot. When the variable resistor 15 of the limiter circuit is adjusted to the resistance value of zero, the diode 14 is turned on and the operational amplifier 3 is output-limited, with a result that a peak portion beyond α in FIG. 10 is cut off from the signal Vd corresponding to the bright zone of FIG. 7(b) and the inverted signal V33 as indicated by a solid line in FIG. 11. This inverted signal V33 is DC-rectified in the voltage doubling rectifier, as shown in FIG. 11(b), providing a voltage doubled signal VP2 which has no signal component of amplitude Vp-p corresponding to the bright zone and is substantially approximate to the average value. Thus, the average photometric mode is established, this mode being suitable for the case in which the dark zone is selected as the main object to be shot. Finally, adjustment of the variable resistor 15 to the intermediate resistance value may provide the photometric mode intermediate of the above-mentioned peak and average photometric modes. Moreover, in the low contrast condition, the amplitude Vd corresponding to the bright zone is low relative to the full amplitude Vp-p of FIG. 7(b), so there is no difference in the amplitude between the peak photometry waveform of FIG. 7(e) and the average photometry waveform of FIG. 11(b). Accordingly, conversion of the photometric mode has no significant influence upon the video signal level. Referring to FIG. 4 which illustrates characteristics of the respective photometric modes for the low contrast scene, a curve (1) corresponds to the average photometric mode and a curve (2) corresponds to the peak photometric mode. Also in FIG. 4, the abscissa indicates the area ratio of the bright zone (with respect to the overall picture) and the ordinate indicates the video signal level. At the area ratio higher than S2, the video output signal level exhibits almost no variation no matter whether the average photometric mode (1) or the peak photometric mode (2) is selected, indicating that the video signal level is not affected by the photometric adjustment in the low contrast situation. In this case, the photometric adjustment of variable average type accompanied with a gradual variation of the video signal is effected as the area ratio is varied by operation of zooming, and the video signal level is maintained substantially constant for the object including the bright zone of which the area ratio is higher than S (1).

In this manner, the sensitivity adjusting means relying upon the variable resistor 7 of said inverted amplifier constitutes the first means principally serving to adjust the video output signal during the low contrast, the photometric adjusting means relying upon the variable resistor 15 of said limiter circuit constitutes the second means principally serving to adjust the video output signal during the high contrast, and, even when said second means is adjusted during the low contrast, the video output signal level once adjusted by said second means is not significantly affected thereby. Furthermore, turning on of the switch 18 of the third means III provides, as in the previous embodiment, the drastic peak photometric characteristic ((3) in FIG. 4).

Figure 5:
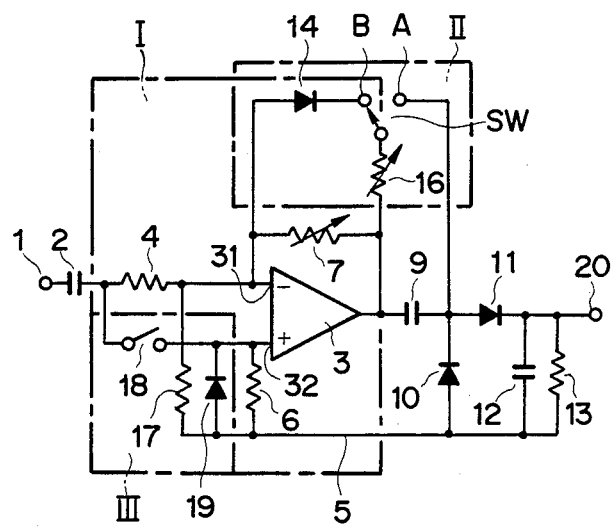
FIG. 5 is a circuit diagram similar to FIGS. 1 and 3 but concerning still another embodiment.
Figure 6:
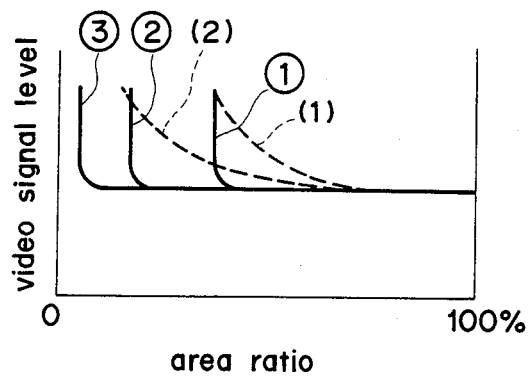
FIG. 6 is a diagram similar to FIGS. 2 and 4 but concerning the embodiment of FIG. 5.

In the circuit diagram of FIG. 5, the circuit elements having the similar functions to those in the circuit diagrams of FIGS. 1 and 3 are designated by the similar reference numerals. Referring to FIG. 5, a variable resistor 16 and a switch SW provided between the terminal 33 and the point P2, in parallel with the the capacitor 9 of the voltage doubling rectifier constitutes the second adjust means of the variable peak photometric type, as shown in FIG. 1, adapted to adjust the charging voltage of the capacitor 9. The diode 14, the switch SW and the variable resistor 16 which are provided in parallel with the variable resistor 7 of the inverted amplifier constitutes the limiter circuit serving as the second adjusting means of variable average photometric type as shown in FIG. 3. In such a manner, the relatively peak-characteristic photometric adjuster circuit included in the second means II is selected by connecting the switch SW to one connection terminal A, the average photometric characteristic (1) is selected by adjusting the variable resistor 16 to the resistance value of zero, and the peak photometric characteristic (2) is selected by adjusting the variable resistor 16 to the resistance value of infinity. The relatively average-characteristic photometric adjuster circuit relying on the limiter circuit in the second means II is selected by connecting the switch SW to another connection terminal B, the average photometric characteristic (1) is selected by adjusting the variable resistor 16 to the resistance value of zero, and the peak photometric characteristic (2) is selected by adjusting said variable resistor 16 to the resistance value of infinity.

Thus, the user can select the photometric adjustment of variable peak photometric type or variable average photometric type merely by changing over the switch SW, carrying out the average photometric adjustment or adjusting the common variable resistor 16 of the peak photometric adjustment, and obtain the drastic peak-characteristic photometric means as indicated by the curve (3) by turning the switch 18 of the third means III on.

Effects

With the device constructed according to the present invention in the manner as has been described hereinabove, the sensitivity adjustment can be achieved by the first measure, for example, adjusting the resistor for varying the amplification ratio of the inverted amplifier, the photometric mode is selected by the second measure, for example, adjusting the variable resistor for photometric adjustment among the average photometric mode, the peak photometric mode and intermediate photometric mode so as to achieve an appropriate photometric adjustment, and the drastic peak photometric means can be activated by operating the switch as the third measure. Additionally, the video signal level is almost not affected by changing over the photometric mode for the object being in the low contrast condition, so the optimum video signal level can be obtained only by the sensitivity adjustment in such low contrast situation and the photometric adjusting can be selectively performed only for the scene of the high contrast. In this way, the sensitivity adjustment and the photometric adjustment may be effected as separate adjusting measures to facilitate adjustment of the optimum video signal level. Furthermore, both the sensitivity adjustment and the photometric adjustment may be performed only once for the object of the low contrast and for the object of the high contrast, respectively, to obtain the optimum picture over a wide contrast range from the lowest contrast to the highest contrast. Finally, the second means also may be selected as desired between the variable peak photometric type and the variable average photometric type. Thus, there is provided the automatic diaphragm control device for the objective of television camera that is useful for various applications.

What is claimed is:

1. An automatic diaphragm control device for objective of television camera utilizing a video signal coming from the television camera to effect the diaphragm control, said automatic diaphragm control device comprising:
    first means consisting of sensitivity adjusting means principally to adjust a video output signal in a low contrast condition;
    second means consisting of variable photometric adjusting means principally to adjust a video output signal in a high contrast condition;
    third means for photometric adjustment of a video output signal in a drastic peak mode independently of the photometric adjustment by said second means; and
    means permitting said third means to be selectively used as desired by switching.

2. An automatic diaphragm control device for objective of television camera as defined by claim 1, wherein the second means permits the variable photometry to be automatically controlled in a peak mode, on one hand, and the video output signal during the high contrast to be continuously adjusted in accordance with an area ratio of a bright zone with respect to an overall object to be shot, on the other hand.

3. An automatic diaphragm control device for objective of television camera as defined by claim 1, wherein the second means permits the variable photometry to be automatically controlled in an average mode, on one hand, and the video output signal during the high contrast to be continuously adjusted in accordance with an area ratio of a bright zone with respect to an overall object to be shot, on the other hand.

4. An automatic diaphragm control device for objective of television camera utilizing a video signal coming from the television camera to effect the diaphragm control, said automatic diaphragm control device comprising:
    first means consisting of sensitivity adjusting means principally to adjust a video output signal in a low contrast condition;
    second means consisting of variable photometric adjusting means principally to adjust a video output signal in a high contrast condition;
    third means for photometric adjustment of a video output signal in a drastic peak mode independently of the photometric adjustment by said second means;
    means permitting said second means to be selectively used as means to perform the variable photometry in a peak mode and means to perform the variable photometry in an average mode as desired by switching therebetween; and
    means permitting said second and third means to be selectively used as desired by switching therebetween.

5. An automatic diaphragm control device for objective of television camera, said automatic diaphragm control device comprising:
    first means consisting of an inverted amplifier adapted for inverted amplification of a video signal from the television camera with a variable amplification ratio relative to a reference voltage;
    second means adapted to be selectively used as desired, by switching, as means for peak photometric adjustment consisting of a voltage doubling rectifier including a capacitor of which the charging voltage can be adjusted by voltage doubling rectifying the video signal inversionally amplified in said inverted amplifier and means for average photometric adjustment consisting of a limiter circuit adapted to adjustably limit a negative component of the video signal inversionally amplified in said inverted amplifier; third means for photometric adjustment of the video output signal in an extreme peak mode independently of the variable photometric adjustment performed by said second means; and means permitting said second and third means to be selectively used as desired by switching therebetween.

* * * * *